United States Patent

Kaji et al.

[11] Patent Number: 6,088,543
[45] Date of Patent: Jul. 11, 2000

[54] OPTICAL TRANSMISSION ELEMENT, AND ILLUMINATION DEVICE EMPLOYING THIS OPTICAL TRANSMISSION ELEMENT

[75] Inventors: Hidenobu Kaji, Yokohama; Motoyuki Ohtake, Kawasaki; Hidenori Miyamoto, Urayasu, all of Japan

[73] Assignee: Nikon Corporation, Tokyo, Japan

[21] Appl. No.: 09/099,459

[22] Filed: Jun. 18, 1998

[30] Foreign Application Priority Data

Jun. 18, 1997 [JP] Japan ................................. 9-161061

[51] Int. Cl.[7] ......................................... G03B 15/03
[52] U.S. Cl. ...................... 396/176; 396/155; 396/267; 362/16
[58] Field of Search .................... 396/155, 267, 396/176; 362/16

[56] References Cited

U.S. PATENT DOCUMENTS 5,556,186  9/1996  Pilby ................................. 362/16
5,617,163  4/1997  Ohtake ............................. 396/176

FOREIGN PATENT DOCUMENTS 8-262537  10/1996  Japan .
8-271426  10/1996  Japan .

Primary Examiner—Russell Adams
Attorney, Agent, or Firm—Oliff & Berridge, PLC

[57] ABSTRACT

An optical transmission element according to the present invention, includes a light transmitting portion that has a plurality of optical elements that are arranged so as to be separated by air gaps, and the air gaps. And, light that is incident upon the light transmitting portion along a predetermined direction is transmitted through the light transmitting portion while reflecting on reflecting surfaces constituted by boundary surfaces that are defined between the optical elements and the air gaps.

15 Claims, 21 Drawing Sheets

OPTICAL TRANSMISSION ELEMENT, AND ILLUMINATION DEVICE EMPLOYING THIS OPTICAL TRANSMISSION ELEMENT

INCORPORATION BY REFERENCE

The disclosures of the following priority applications are herein incorporated by reference:

Japanese Patent Application No. 8-271426, filed Sep. 20, 1996; and Japanese Patent Application No. 9-161061, filed Jun. 18, 1997.

BACKGROUND OF THE INVENTION

1. Field of the Invention

The present invention relates to an optical transmission element, and to an illumination device which employs this optical transmission element.

2. Description of the Related Art

It is per se known to provide a camera with an internal electronic flash device (a flash or strobe) in order, when performing photography, to illuminate the photographic subject. Normally, such an electronic flash device is provided with an electric discharge tube which generates light by electric discharge, and with a reflector for reflecting the light which has been generated by this electric discharge tube more efficiently towards the photographic subject.

However, with a prior art electronic flash device which comprises an electric discharge tube and a reflector, since it is so arranged that the light which has been diffused radially from the position of the electric discharge tube illuminates the photographic subject directly, therefore it is necessary to position the electronic flash device a certain distance away from other elements of the camera, so as to ensure that the light path is not intercepted by these other camera elements. Accordingly this sets fixed limits with respect to the design and disposition of the electronic flash device, and the problem arises that it becomes difficult to make the camera more compact.

SUMMARY OF THE INVENTION

The object of the present invention is to provide an optical transmitting element that enhances freedom in designing and obtains suitable light distributing (or regulating) characteristics (or good illuminating characteristics) in an illumination device such as an electronic flush device for a camera, and the illumination device that employs the optical transmitting element.

In order to attain this object, an optical transmission element according to the present invention, comprises a light transmitting portion that includes a plurality of optical elements that are arranged so as to be separated by air gaps, and the air gaps. And, light that is incident upon the light transmitting portion along a predetermined direction is transmitted through the light transmitting portion while reflecting on reflecting surfaces constituted by boundary surfaces that are defined between the optical elements and the air gaps.

An illumination device according to the present invention comprises: a light source; and a light transmitting portion that includes a plurality of optical elements that are arranged so as to be separated by air gaps, and the air gaps. And light that is emitted from the light source is incident upon one end side of the light transmitting portion; and the light that is incident upon one end side of the light transmitting portion is transmitted through the light transmitting portion while reflecting on reflecting surfaces constituted by boundary surfaces that are defined between the optical elements and the air gaps, and is then emitted from other end side of the light transmitting portion.

DESCRIPTION OF THE PREFERRED EMBODIMENTS

Preferred Embodiment 1

In the following, an internally provided electronic flash device for a camera which is the first preferred embodiment of the illumination device according to the present invention will be described with reference to FIGS. 1 through 6.

Figure 1:
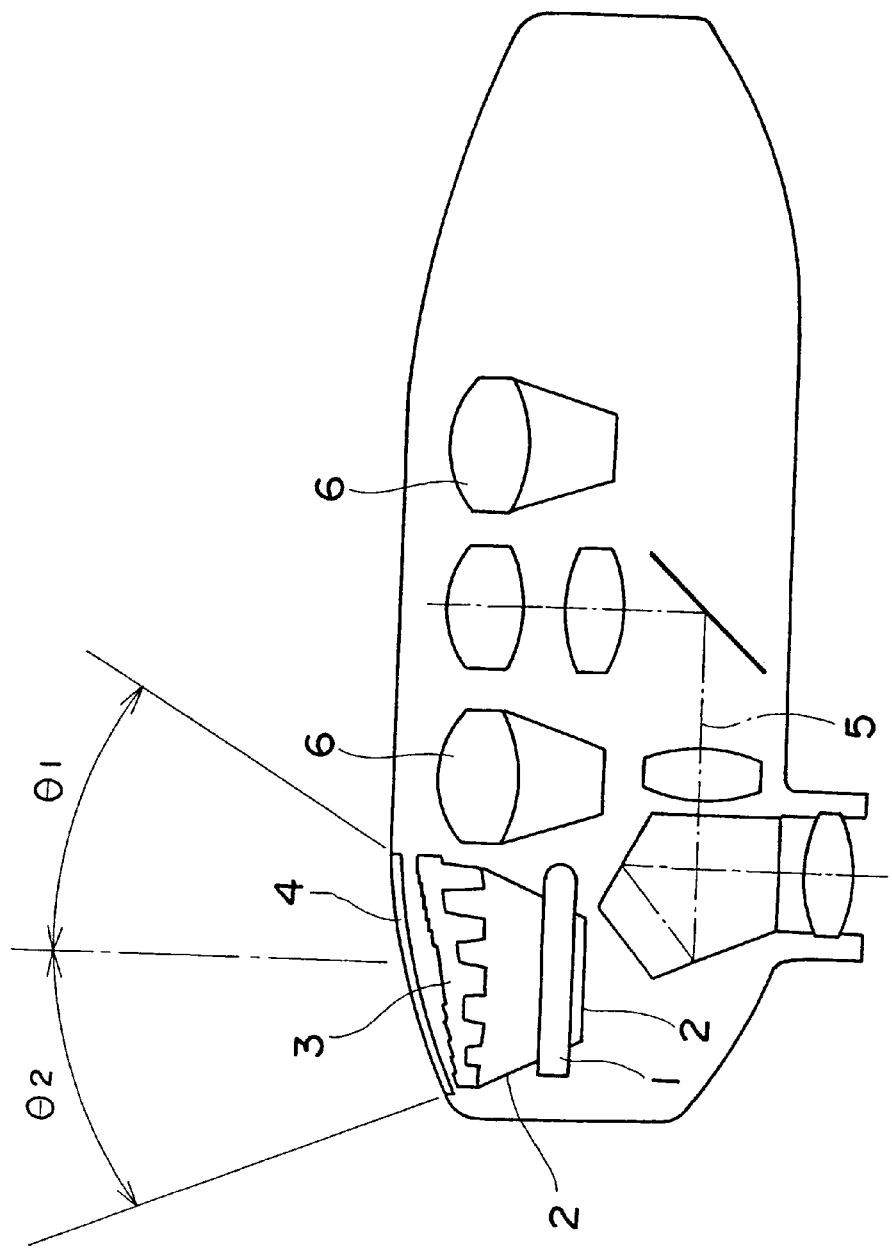
FIG. 1 is a sectional view of a camera which is equipped with an internally provided electronic flash device for a camera according to a first preferred embodiment of the present invention.
Figure 2:
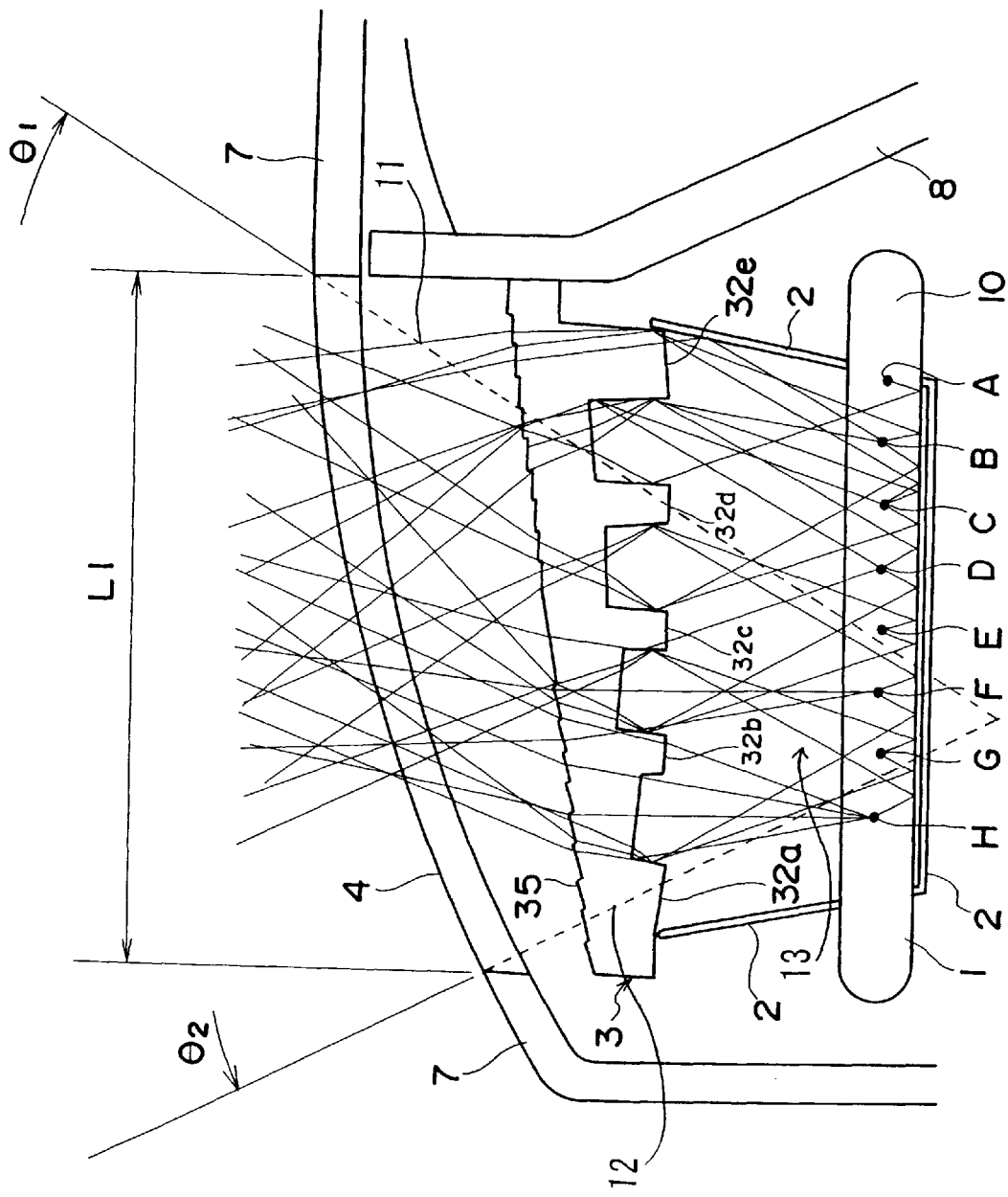
FIG. 2 is a simulated figure showing the operation of this internally provided electronic flash device for a camera according to the first preferred embodiment.

In FIGS. 1 and 2, the reference numeral 1 denotes an electric discharge tube (a xenon tube) which emits light when a photograph is to be taken, while 2 is a reflector which reflects light which has been emitted from the electric discharge tube 1, 3 is an optical transmission element made of transparent resin (synthetic resin or plastic) which propagates (transmits) and diffuses the emitted light from the electric discharge tube 1, and 4 is a flash light window which is provided to a front face cover 7 (vide FIG. 2) of the camera. The refractive index of the transparent resin from which the optical transmission element 3 is made is greater than the refractive index of air. Further, in FIG. 1, 5 is a viewfinder device for checking the photographic subject when taking a photograph (the optical axis thereof is shown by the single-dotted line), while 6 is a distance measurement device for measuring the distance to the photographic subject, and (referring to FIG. 2) 8 is a light shield member for shielding the other components of the camera from the light from the electric discharge tube 1. Since the optical transmission element 3 corresponds to an element which may be termed a protector for the electronic flash device, in the following explanation it will also hereinafter be termed a protector 3. Further, by diffusion of the light by the optical transmission element 3 is meant that it emits light over a certain light distribution angle (directional angle).

As shown in FIG. 2, the electric discharge tube 1 extends in the transverse direction across the camera in a part cylindrical configuration, and electrodes not shown in the figures are provided at opposite ends of this electric discharge tube 1. Gas discharge is initiated by application of voltage between these electrodes, and thereby the electric discharge tube 1 is caused to emit light over its entire extent of an almost uniform intensity.

As shown in FIG. 2, the reflector 2 is arranged along the electric discharge tube I on its side which confronts the rear side of the camera, and end portions of this reflector 2 are bent forwards to rest against the two end portions of the protector 3, so that the reflector 2 reflects light which has been emitted from the electric discharge tube 1 towards the rear and the sides of the camera.

Figure 3:
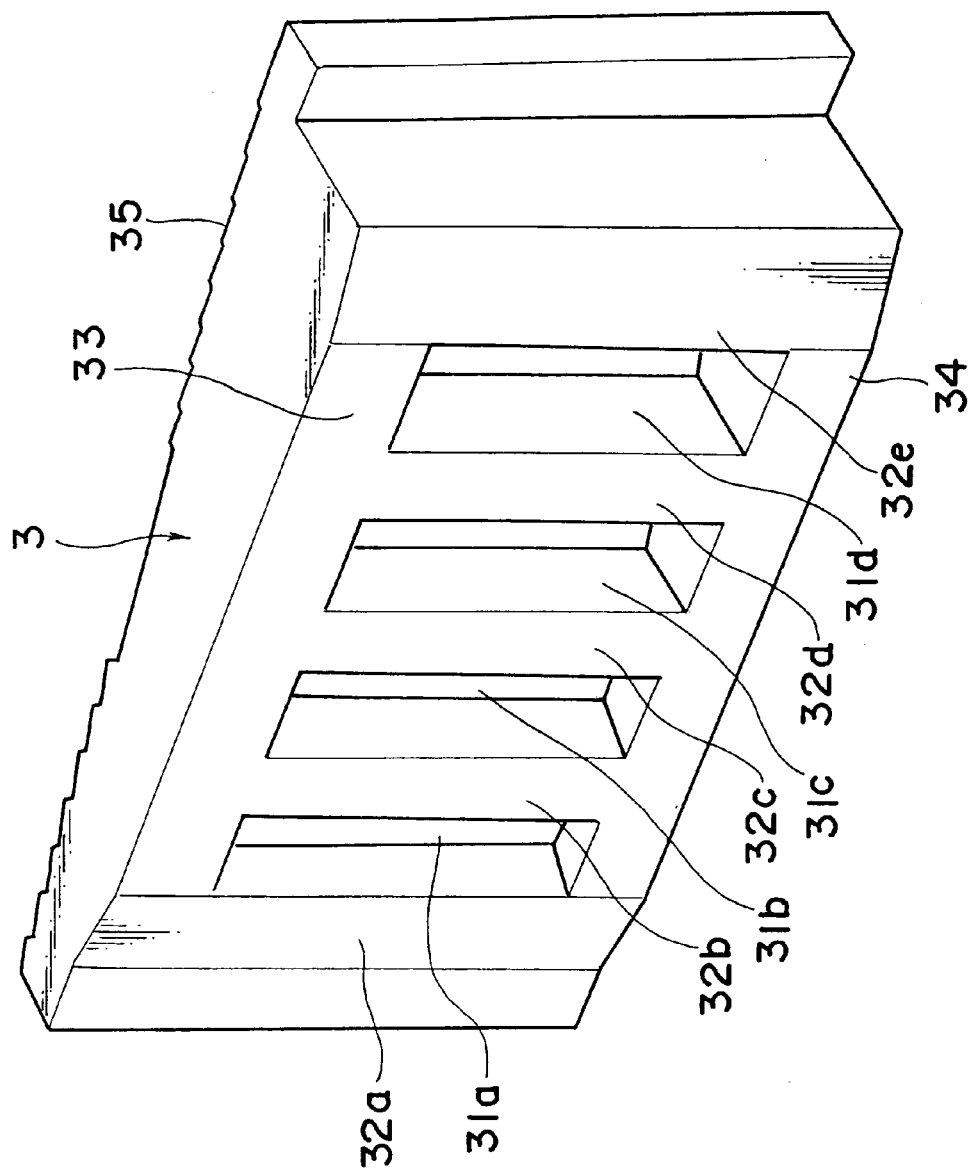
FIG. 3 is a perspective view showing a protector.

In this first preferred embodiment, the shape of the protector 3 is determined by performing simulation experiments so as to provide the illumination characteristic shown in FIG. 2, in order to provide desirable optical characteristics for emission angle and uniformity of illumination amount and the like. As shown in FIGS. 3 and 4, on the surface of the protector 3 which faces to the rear of the camera there are formed concave portions 31a, 31b, 31c and 31d, and projections 32a, 32b, 32c, 32d and 32e which are mutually separated from one another by these concave portions 31a through 31d are defined thereby and project towards the rear of the camera. Although it is not so depicted in FIG. 2, a portion of the light which impinges upon the side surfaces of the concave portions 31a through 31d of the protector 3 is refracted into the interior of the protector 3 and continues onwards.

Figure 4A:
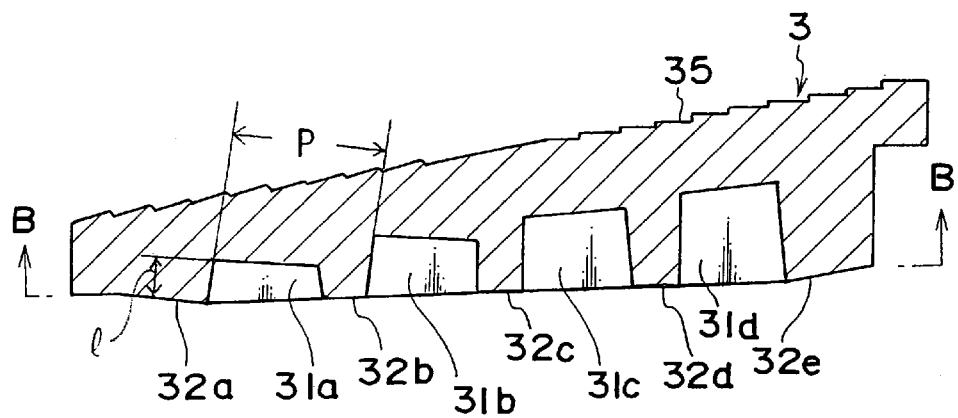
FIG. 4A is a sectional view of this protector taken on the line A—A in FIG. 4B.
Figure 4B:
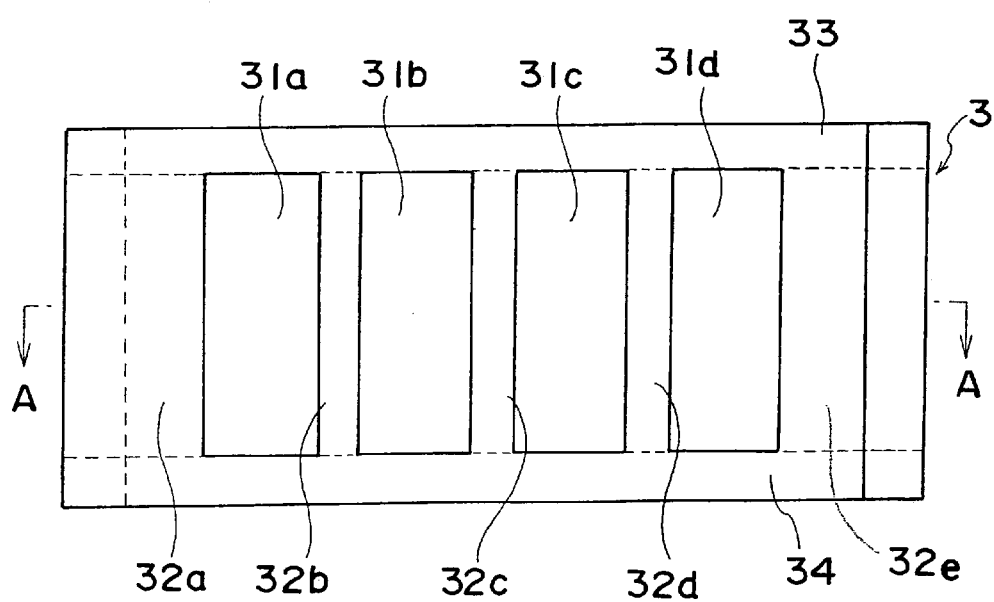
FIG. 4B is an elevational view of this protector as seen in a direction shown by the arrows B in FIG. 4A.

As shown in FIG. 4B, the cross sectional shapes of the projections 32a through 32e of the protector 3 are long rectangles which extend in the vertical direction of the camera (the direction perpendicular to the plane of the drawing paper in FIG. 1), and these projections are connected at their upper and lower short sides in FIG. 4B with edge portions 33 and 34 of the protector 3.

As shown in FIG. 4A, the ratio of the length 1 of the projections 32a through 32e (the length in the vertical direction as seen in FIG. 4A) to the pitch p of these projections 32a through 32e is from about ¼ to ¾. That is to say, this ratio is about ¼ for the projections 32a and 32b which are the shortest in the fore and aft direction of the camera (the vertical direction in FIG. 1), and is about ¾ for the projection 32e which is the longest in the fore and aft direction of the camera.

Figure 5:
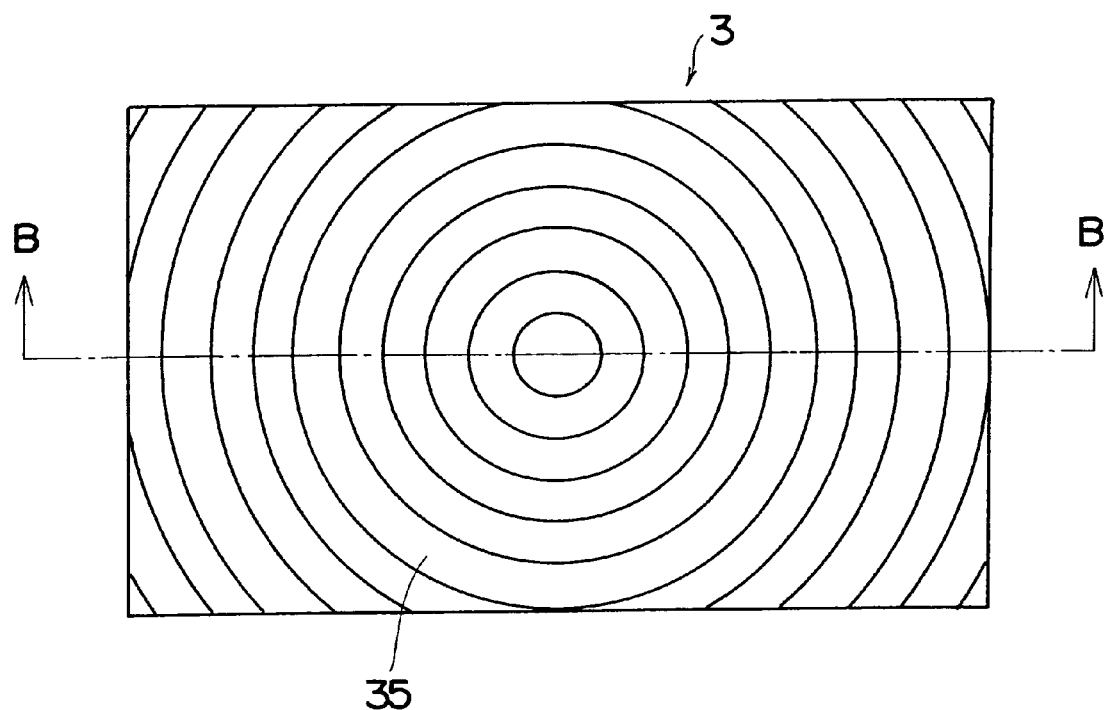
FIG. 5 is a figure showing a Fresnel lens which is formed upon this protector.

As shown in FIGS. 2 through 4, on the surface of the protector 3 towards the front of the camera there are formed sloping surfaces of angle conforming to the shape of the front face of the camera, and a Fresnel lens 35 is defined at this surface by the concave and convex concentric circular shapes thereof, as shown in FIG. 5.

In this first preferred embodiment the protector 3 is formed from transparent resin as one integral unit, and accordingly not only can the positional determination of the projections 32a through 32e and of the elements of the Fresnel lens 35 be maintained at high accuracy, but also the cost of manufacture can be kept low, since the manufacturing process is simple.

The operation of this internally provided electronic flash device for a camera according to the first preferred embodiment of the present invention structured as described above will now be explained.

When voltage is applied between the electrodes of the electric discharge tube 1, the tube 1 emits light by electric discharge, and a portion of the emitted light is incident directly upon the protector 3, while another portion is incident upon the reflector 2. When the direct light emitted from the electric discharge tube 1 or the light emitted therefrom which has been reflected by the reflector 2 is incident upon the protector 3, diffusion of this incident light is mainly prevented by the action of reflection by the side surfaces of the projections 32a through 32e, so that this incident light is efficiently directed towards the Fresnel lens 35. After this light has been regulated within predetermined angles by the Fresnel lens 35, it is emitted through the flash light window 4 so as to illuminate the photographic subject. The angle θ1 in FIGS. 1 and 2 is the angle in the rightward direction within which the emitted light is regulated, while the angle θ2 in FIGS. 1 and 2 is the angle in the leftward direction within which the emitted light is regulated. By regulation of the light within these predetermined angles by the Fresnel lens 35, it is meant in this first preferred embodiment that the light is diffused by the Fresnel lens so as to be regulated within these predetermined angles. However, it could also be the case that the light might be concentrated by the Fresnel lens 1 so as to be regulated within these predetermined angles. By the action of reflection by the side surfaces of the projections 32a through 32e, there is meant to be included both the case in which according to the incident angle upon the side surface a portion of the light is reflected and a portion is transmitted, and the case in which, for the direction from the interior of the projections 32a through 32e to the outside, the light is totally reflected because of the angle of incidence.

With this internally provided electronic flash device for a camera according to the first preferred embodiment of the present invention, the construction is such that the light from the electronic flash tube I which approaches and is incident upon the left side in FIG. 2 of the protector 3 is mainly diffused in the rightward direction (the direction of the angle θ1), while the light from the electronic flash tube 1 which approaches and is incident upon the right side in FIG. 2 of the protector 3 is mainly diffused in the leftward direction (the direction of the angle θ2). Due to this, the light from the electronic flash device can be directed over a wide angle of illumination in the rightward direction (the direction of the angle θ1) without being deflected by the light shield member 8, and also there is no increase in the amount of light loss in the electronic flash device as a whole. In FIG. 2, the points A through H in the electric discharge tube 1 represent for simulation the positions of light sources, and the straight lines (bent lines) drawn from each point A through H represent in the simulation light rays which are emitted from each of the points A through H.

As shown in FIG. 2, even if all light source points are not within a space 13 that is surrounded by planes 11 and 12 which pass edges of the flash light window 4 with angles θ1 andθ2 and the plane of the window 4, light from all light sources of the electric discharge tube 1 is lead efficiently by the protector 3. In other words, although the light source points A through E and H are not within the space 13, light emitted from their points A through E and H is emitted with angles θ1 and θ2 that regulate a range of emitting light out of the internally provided electronic flash device. Accordingly, the size of the flash light window 4 can be reduced. It is noted that even if all light sources A through H of the electric discharge tube 1 are out of the space 13, light from all light sources A through H can be led efficiently by the protector 3. Also, as far as the above effect can be achieved, the shape of the protector 3 can be varied accordingly.

Figure 6:
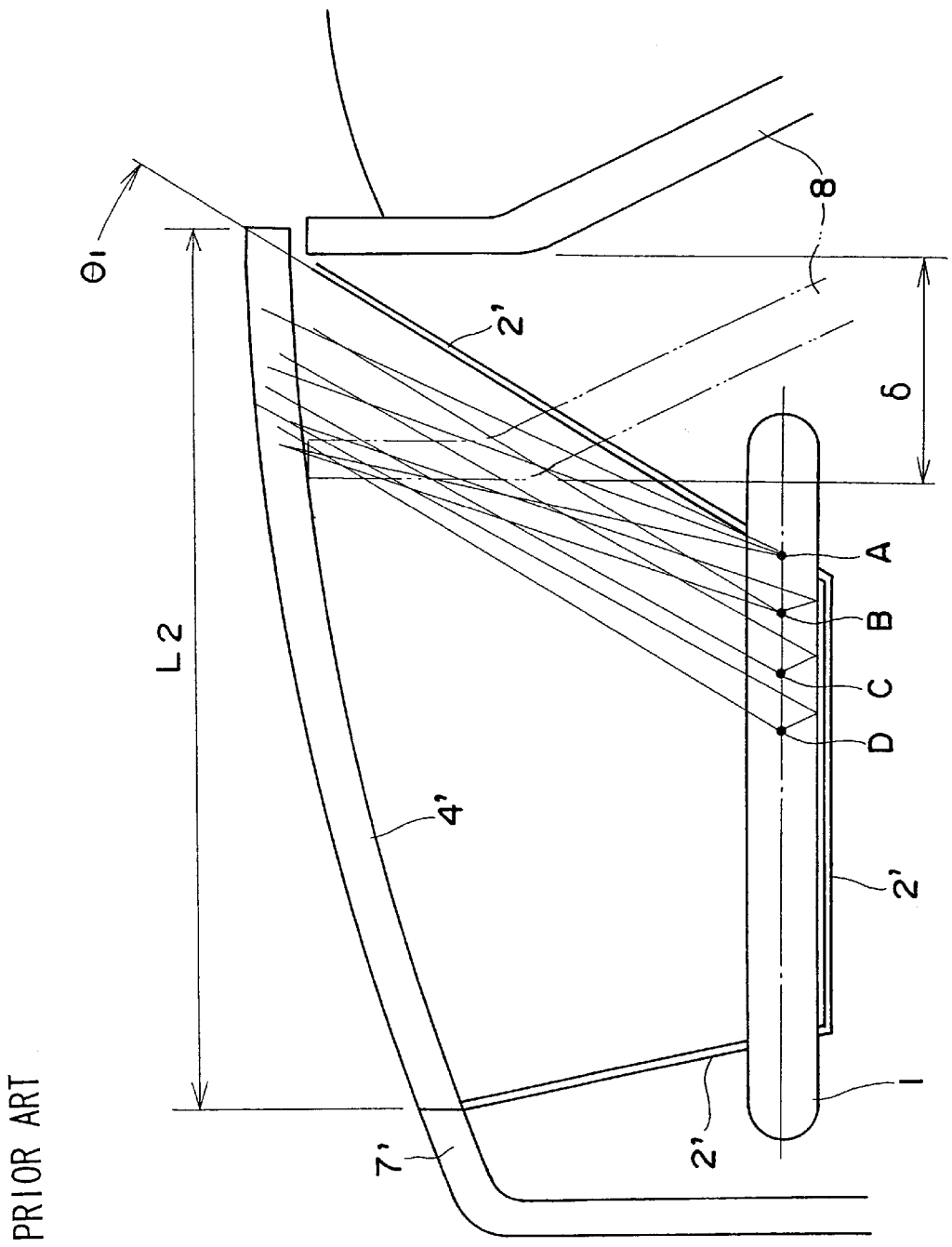
FIG. 6 is a sectional view showing a camera which employs a prior art electronic flash device.

FIG. 6 shows a prior art electronic flash device which does not employ any such protector 3. In this case, if the angle θ1 of regulation in the rightward direction is ensured in the same manner as in the first preferred embodiment described above, it is necessary to shift the position of the electric discharge tube 1 by the distance (in FIG. 6 in order to avoid deflection of the light rays by the light shield member 8 (in FIG. 6 it is shown that the light shield member 8 is shifted). As will be clear by comparison with FIG. 2, the distance L1 (FIG. 2) from the light shield member 8 to the end portion of the flash light window 4 is increased to the distance L2 (FIG. 6), and accordingly the size of the camera is undesirably increased by this amount. It should be noted that in FIG. 6 constructional elements which are the same as ones in FIG. 2 are denoted by the same reference numerals, while ones which correspond to ones in FIG. 2 are denoted by the same reference numerals which are the same with an apostrophe appended.

By contrast to this, with the internally provided electronic flash device for a camera according to the first preferred embodiment of the present invention, since the protector 3 is employed which combines the projections 32a through 32e which prevent the diffusion of the light along with the Fresnel lens 35 which diffuses the light, accordingly it is possible to obtain a wide angle of illumination even though the light of the electronic flash device is emitted through the relatively small flash light window 4, and thus it is possible to make the camera more compact.

Although with the above described first preferred embodiment the projections 32a through 32e were provided as projecting in the direction of the electric discharge tube 1 (towards the rear of the camera) from the side of the Fresnel lens 35, it would also be possible as an alternative, for example, to construct the device so that the direction of the projections was towards the front face of the camera from the electric discharge tube 1, and to provide a diffusion means such as a Fresnel lens or the like before the projections.

Next, the protector 3 used in the first embodiment will be explained separately in detail in comparison with the prior art. The explanation will refer to FIGS. 7 through 12 and FIGS. 28 through 32. Although the form of the protector 3 of FIG. 3 described above was determined according to results obtained from simulation by taking an exemplary application to an internally provided electronic flash device for a camera, the following explanation will be given using drawings which show a shape which differs from the shape shown in FIG. 3, in order to explain the theoretical implication as an optical transmission element.

Figure 28:
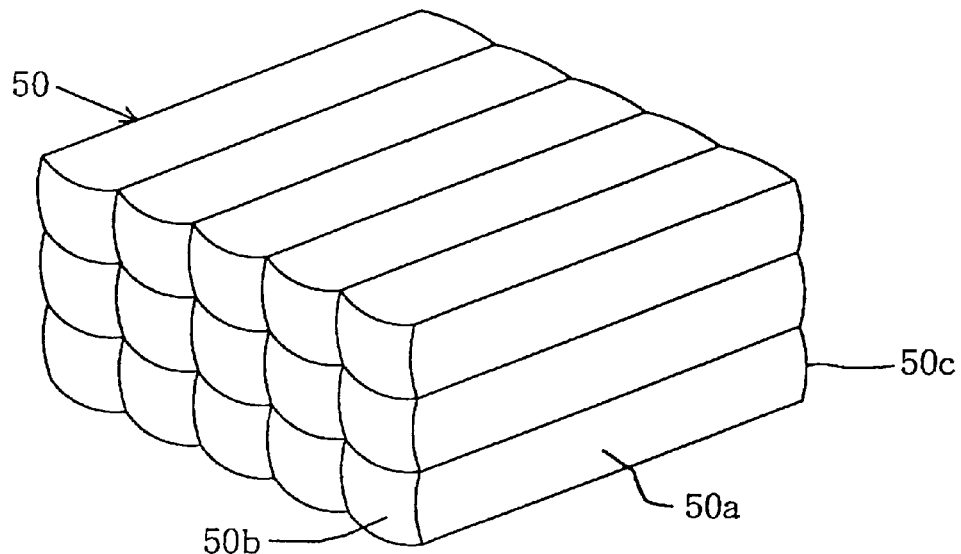
FIG. 28 is a perspective view showing in sketch form the structure of a fly-eye lens array according to the prior art.

FIG. 28 is a perspective view showing in sketch form the structure of a fly-eye lens array which has been used in the prior art. As shown in this figure, a fly-eye lens array 50 is made up from a plurality of long and thin lens elements 50a whose side faces are polished. This plurality of lens elements 50a are densely stacked so that their side surfaces mutually contact one another. Accordingly, a light bundle which is incident upon the incident face 50b of anyone of these lens elements 50a is emitted from the emitting face 50c thereof after having been totally internally reflected several times from its side surfaces.

Figure 29:
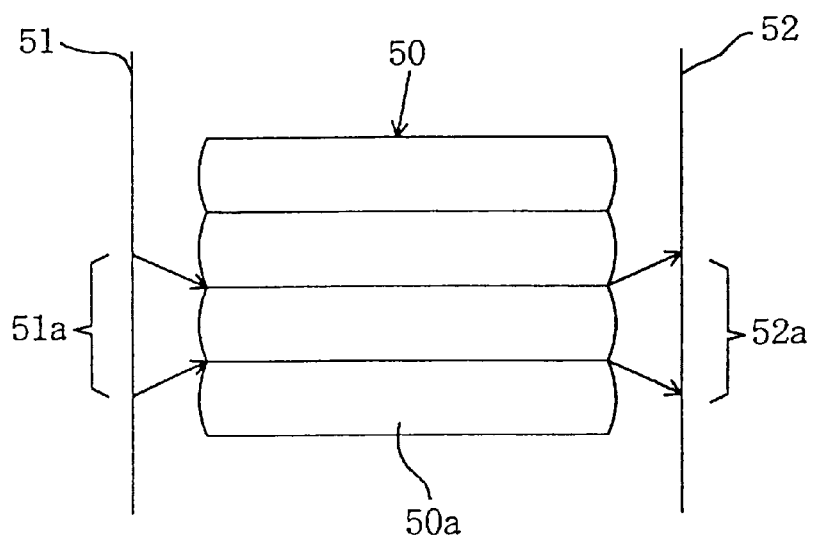
FIG. 29 is a view for explanation of the operation of this fly-eye lens array according to the prior art.

FIG. 29 is a view for explanation of the operation of this fly-eye lens array according to the prior art. As shown in FIG. 29, each lens element 50a which makes up the fly-eye lens array 50 functions so as to lead a light flux (a ray bundle or light) from a limited portion 51a of a light source 51 to a limited portion 52a of an illumination range 52. As a result, it is possible to lead the light flux which is emitted from the entire light source 50 to the entire illumination range 52, via the entire fly-eye lens array 50 which is made up from the plurality of lens elements 50a. By doing this it is possible to restrain the light flux from the light source from spreading out in the fly-eye lens array 50.

However, with a fly-eye lens array, each lens element has a very long and thin shape. Accordingly, this system has the deficiency that the process of polishing or grinding the lens faces (the incident face and the emitting face) of each lens element is difficult. Further, there is the deficiency with a fly-eye lens array that reduction of the cost of manufacture is difficult, because it is necessary to fix the lens elements securely in place so that their side surfaces are in mutual contact.

On the other hand, the optical transmission element according to the present invention comprises a light transmitting portion which is made by arranging a plurality of optical elements with air gaps separating them. A light flux directed in a predetermined direction which is incident upon the light transmitting portion is reflected by the reflecting surfaces which are constituted by the transitions between the optical elements and the air gaps, and is emitted after having been propagated through the light transmitting portion. By doing this, the optical transmission element of the present invention is able to propagate a light flux from a light source while restraining it from spreading out. In particular, support portions which mutually connect together the various optical elements are provided, and it is possible to form the plurality of optical elements and support portions unitarily by using a material such as for example a plastic which can be formed by injection molding for the plurality of optical elements and support portions. As a result, it is possible to obtain an optical transmission element whose cost is low and whose manufacturing process is simple, by comparison with a prior art fly-eye lens array.

In particular, by making the length of the light transmitting portion in the direction of propagation of the light flux to be greater as compared to the pitch of the optical elements and the air gaps, it becomes possible to restrain the spreading out of the light flux more favorably. This is for the same reason that, with the prior art fly-eye lens array, the longer and narrower are the lens elements which make it up, the more favorably is it possible to restrain the spreading out of the light flux. However, although a more favorable result is obtained by making the length of the light transmitting portion in the direction of propagation of the light flux to be greater as compared to the pitch of the optical elements and the air gaps, nevertheless the beneficial effects of the present invention can be exhibited even if the length of the light transmitting portion is shorter than the pitch of the optical elements and the air gaps.

In the following, the beneficial effects obtained by the disposition of the optical transmission element according to the present invention in an illumination optical system will be explained.

Although as has been described above the optical transmission element of the present invention can be utilized in a flash emission type electronic flash device optical system which is used in a camera or the like, further, it can also be employed in a light taking-in optical system to illuminate a visual field frame of a light taking-in type viewfinder (for example a bright-frame viewfinder), or in an illumination optical system such as a backlight optical system which is used for an LCD panel, or the like. For such an optical system, the light path is required to be short and the cost low. Accordingly, in this type of illumination optical system, it is common to utilize optical transmission elements which are formed using a plastic material or the like, so that they can be easily copied even if they are of a complicated shape. For example, in an electronic flash device optical system, a Fresnel lens may be used which is made from a plastic material or the like.

Figure 30:
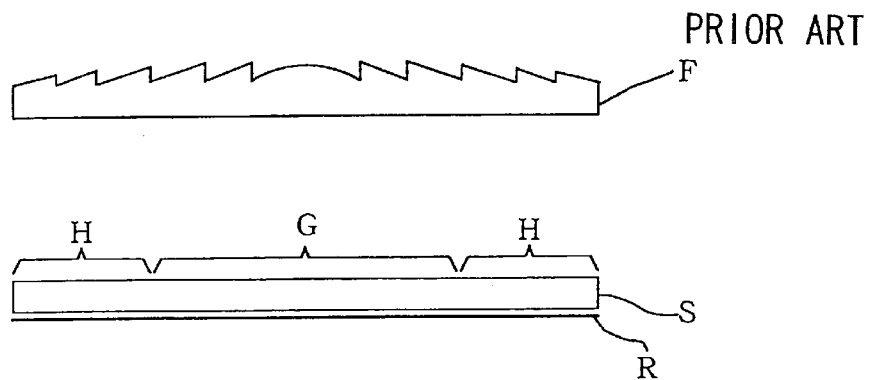
FIG. 30 is a view showing in sketch form the main structure of an electronic flash device optical system which employs a Fresnel lens according to the prior art.

FIG. 30 is a view showing in sketch form the main structure of an electronic flash device optical system which employs a Fresnel lens according to the prior art. In the electronic flash device optical system shown in FIG. 30, the Fresnel lens F is disposed between a light source S, that may for example consist of a xenon flash lamp (particularly termed a xenon tube, if it is shaped as a circular cylinder), and a photographic subject (not shown in the figures). The light fluxes that have been emitted by the light source S arrive at the Fresnel lens F either directly not via a reflector R, or after having been reflected off the reflector R. The light fluxes from the light source S which have passed through the Fresnel lens F are directed by the Fresnel lens so that they illuminate a predetermined range. Due to this, the face of the Fresnel lens towards the light source is formed as a planar surface, while its face towards the photographic subject is formed as a Fresnel surface which has concentric circles.

A Fresnel lens differs from the general type of spherical lens in having the advantage that it can be made thinner. Further there is the advantage that the freedom for compensation of aberration is greater than that with a spherical lens, since the Fresnel angle for each Fresnel element can be varied individually. However there is the inconvenience that the light loss becomes extremely large when a plurality of Fresnel lenses are disposed in the optical path of a single optical system, since a certain loss of light is attributable to the steps between the neighboring Fresnel elements.

Thus it is advisable not to dispose a plurality of Fresnel lenses simultaneously in the optical path of a single optical system, in order to restrain the amount of light loss. Further, as described before, although with a Fresnel lens the freedom for correction of aberration is greater, it is not possible simultaneously to compensate for the aberration upon the axis of a single Fresnel lens and also the aberration off the axis. Accordingly, with the electronic flash device optical system of FIG. 30 in which a single Fresnel lens is used, there is a large residual amount of aberration off the optical axis. As a result, it can easily happen that light fluxes from the end portions H of the xenon tube S are conducted to outside the predetermined range which is to be illuminated to a greater extent than is the light flux from its central portion G, which causes undesirable deterioration of the illumination efficiency. In particular, the amounts of aberration which are generated in the light fluxes from the end portions H of the xenon tube S undesirably become extremely large if the length thereof is increased in order easily to increase the amount of illumination. Due to this, an extremely long xenon tube S becomes necessary in order easily to increase the amount of illumination.

Figure 31:
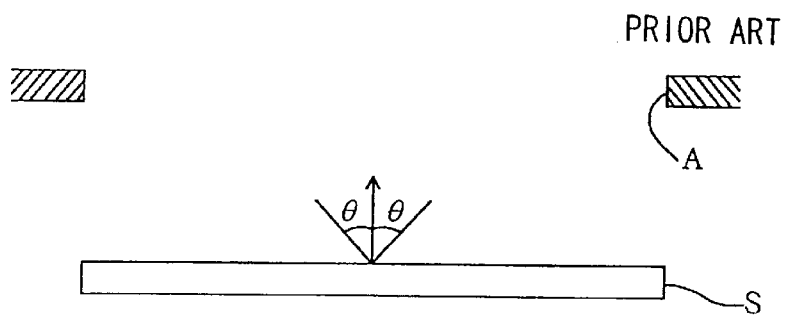
FIG. 31 is a figure for explanation of the operation of the Fresnel lens F of the electronic flash device optical system of FIG. 30 according to the prior art, showing the case in which the Fresnel lens F is not provided.
Figure 32:
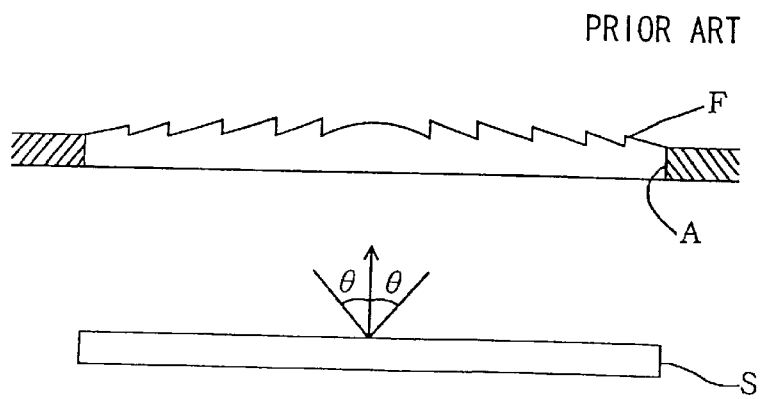
FIG. 32 is a figure for explanation of the operation of the Fresnel lens F of the electronic flash device optical system of FIG. 30 according to the prior art, showing the case in which the Fresnel lens F is provided.

FIG. 31 and FIG. 32 are figures for explanation of the operation of the Fresnel lens F of the electronic flash device optical system according to the prior art of FIG. 30, FIG. 31 showing the case in which the Fresnel lens F is not provided, and FIG. 32 showing the case in which the Fresnel lens F is provided.

If as shown in FIG. 31 no Fresnel lens F is provided, then the range which can be illuminated is determined according to the spreading out of the light fluxes, which depends upon the spreading out angle θ of the light flux which is generated by one point of the xenon tube S, and upon the magnitude of the aperture portion A. On the other hand, if as shown in FIG. 32 the Fresnel lens F of positive refractive power is provided in the aperture portion A, then the light flux which is generated by one point of the xenon tube S is concentrated by the refractive action of the Fresnel lens F. Due to this, it is possible to restrain the spreading out of the light fluxes, which depend upon the spreading out angle θ of the light flux which is generated by one point of the xenon tube S, and upon the magnitude of the aperture portion A. However, as described above, there is a considerable scope for improvement of the illumination ratio when the length of the xenon tube S becomes great, since the spreading out of the light fluxes generated due to residual aberration of the Fresnel lens F also becomes great.

Figure 7:
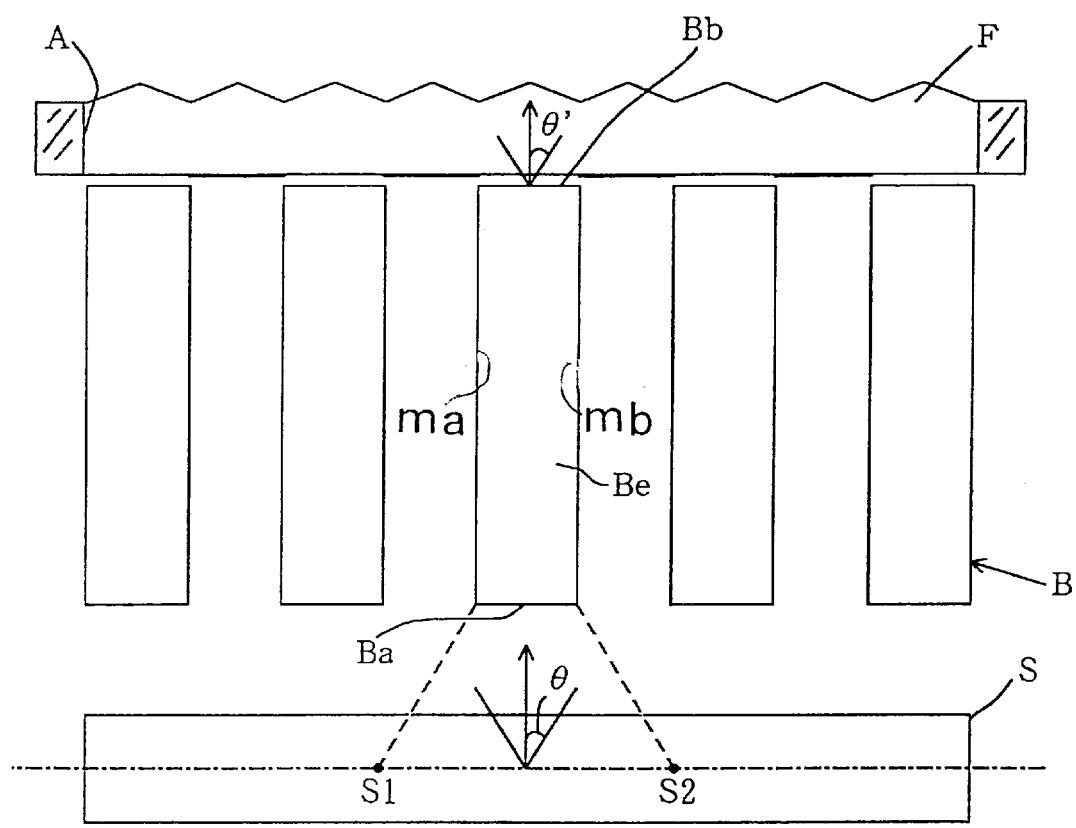
FIG. 7 is a sectional view showing the construction of an illumination optical system which includes an optical transmission element.

Next, an illumination optical system to which the optical transmission element is fitted will be explained. FIG. 7 is a sectional view showing the construction of an illumination optical system to which an optical transmission element according to the present invention has been fitted. In FIG. 7, light fluxes which are emitted by a range from S1 to S2 of a xenon tube S are incident upon a single optical element Be from among the plurality of optical elements which make up the optical transmission element B of the present invention. A light flux which is incident upon the incident face Ba of the optical element Be, after being reflected by the boundary surfaces ma and mb between the optical element Be and the air gaps on either side thereof, is propagated to the emitting face Bb of the optical element Be. Since the range from SI to S2 is narrow, the spreading out angle θ' of the light flux emitted from the emitting face Bb of the optical element Be is almost the same as the spreading out angle θ of the light flux which is emitted by one point upon the xenon tube S. The light flux emitted from the emitting face Bb of the optical element Be is concentrated by the Fresnel lens which is disposed in the aperture portion A. By doing this it is possible, with the optical transmission element of the present invention, considerably to restrict the spreading out of the light fluxes, which depends upon the spreading out angle θ of the light flux which is emitted by one point upon the xenon tube S and upon the magnitude of the aperture portion A.

Further, with the construction shown in FIG. 7, a light flux which is emitted from an optical element and a light flux which is emitted from a neighboring air gap do not interfere with one another in the Fresnel lens F, since the light fluxes are incident upon the Fresnel lens F via the optical elements and the air gaps without much spreading out. Accordingly it is possible to restrain the spreading out of the light fluxes due to aberration, by concentrating by the Fresnel elements which are arranged in correspondence with the optical elements and the air gaps.

Further, according to the present invention, if this optical transmission element is fitted to an illumination optical system such as an electronic flash device optical system or the like, a construction is possible in which the support portion for joining together and mutually supporting the optical elements is provided with a Fresnel lens which has a refractive function. According to this construction, a single optical transmission element can combine the operation of propagation while restraining the spreading out of the light flux and the operation of a Fresnel lens.

Figure 8:
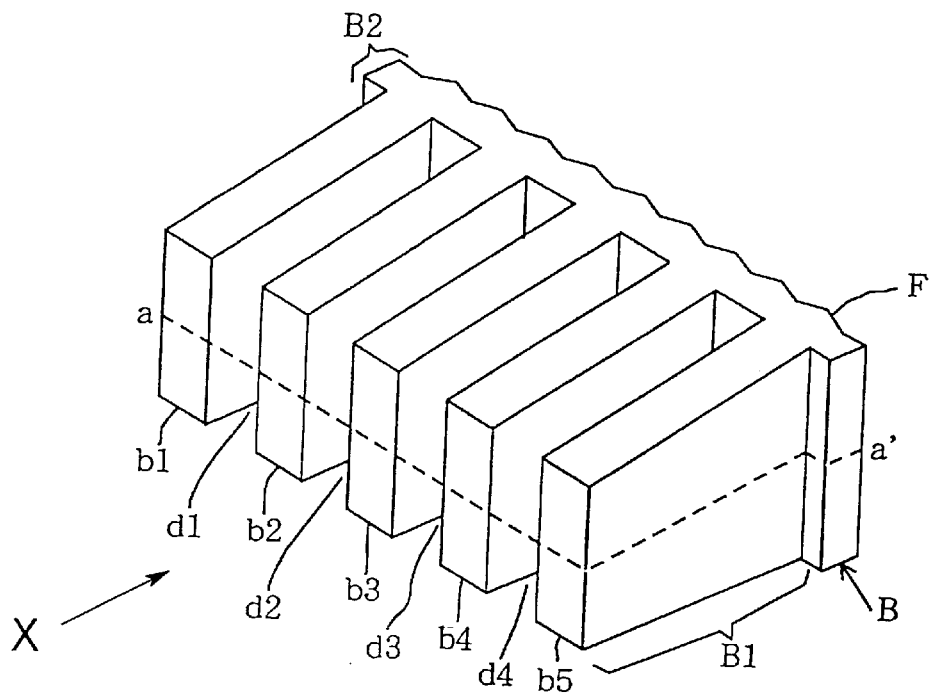
FIG. 8 is a perspective view showing in sketch form the structure of the optical transmission element.
Figure 9:
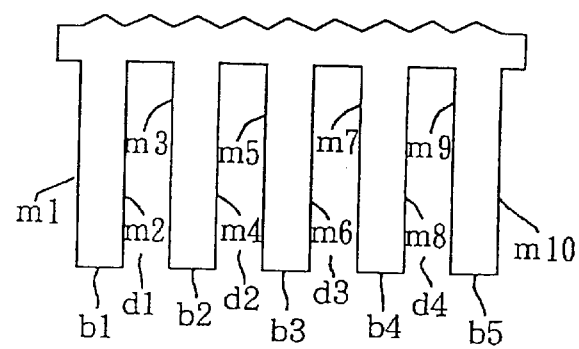
FIG. 9 is a sectional view taken on the line a–a' in FIG. 8.
Figure 10:
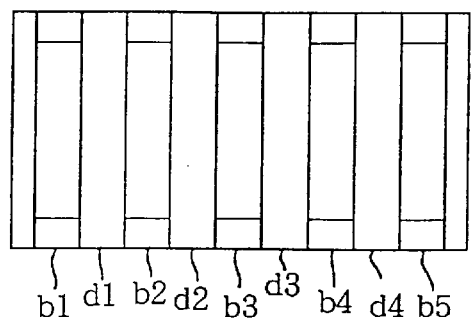
FIG. 10 is an elevational view of the optical transmission element of FIG. 9.

FIG. 8 is a perspective view showing in sketch form the structure of the optical transmission element. Further, FIG. 9 is a sectional view taken on the line a–a' in FIG. 8, and FIG. 10 is an elevational view of the optical transmission element as seen in the direction shown by the arrow X. Although the protector (optical transmission element) 3 of FIG. 3 is very similar to one which is actually manufactured in order to be internally provided to an electronic flash device for a camera, the optical transmission element of FIG. 8 is only described in sketch form in order for its operation to be theoretically explained. The protector (optical transmission element) 3 of FIG. 3 and the optical transmission element of FIG. 8 are theoretically identical.

As shown in FIGS. 8 through 10, the optical transmission element B is made up from a light transmitting portion B1 and a support portion B2. The light transmitting portion B1 is made up of five optical elements b1 through b5 which are separated by air gaps d1 through d4.

In detail, as shown in FIG. 9, boundary surfaces m1 through m10 are defined between the optical elements and the air gaps. These boundary surfaces m1 through m10 are planes which are almost parallel to one another, and the intervals between any two neighboring ones of these boundary surfaces are made so as to be almost the same.

Further, the five optical elements b1 through b5 are supported in a cantilevered manner from the face on one side of the support portion B2, and the Fresnel lens F is formed on the face on the other side of the support portion B2. The Fresnel lens F is made up from a plurality of Fresnel elements, and its sectional form is a saw shape which is made up from a plurality of ridges. And each of the Fresnel elements is arranged so as to correspond to the optical elements b1 through b5 and the air gaps d1 through d4.

Figure 11:
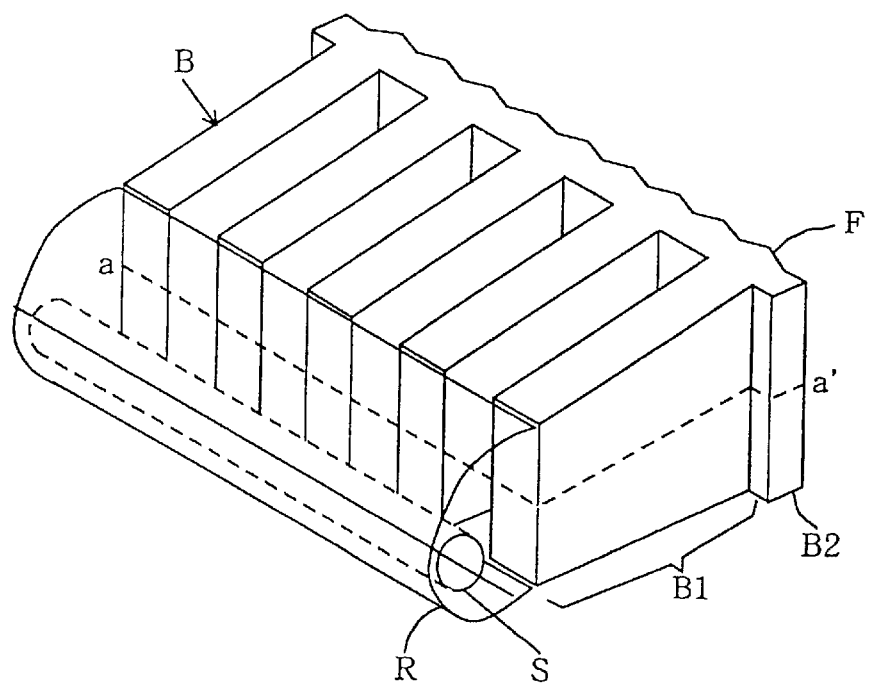
FIG. 11 is a perspective view showing the construction of an electronic flash device optical system for a lens shutter type camera which includes an optical transmission element B.
Figure 12:
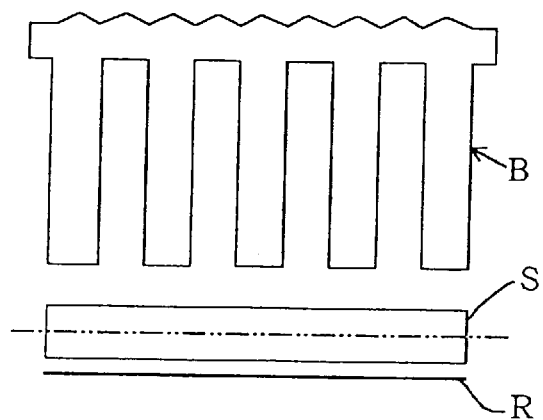
FIG. 12 is a sectional view taken on the line a–a' in FIG. 11.

FIG. 11 is a perspective view showing the construction of an electronic flash device optical system for a lens shutter type camera to which an optical transmission element B is fitted. Further, FIG. 12 is a sectional view taken on the line a–a' in FIG. 11. Referring to FIGS. 11 and 12, the optical transmission element B is arranged on one side of the xenon flash lamp S which is the light source, while the reflector R is arranged around the other side of the xenon flash lamp S so as to enfold the xenon flash lamp S.

Accordingly, the light fluxes which are emitted by the xenon flash lamp S are incident upon the light transmitting portion B1 (the optical elements b1 through b5 and the air gaps d1 through d4) of the optical transmission element B either directly not via the reflector R, or after having been reflected off the reflector R. The light fluxes which are incident upon the light transmitting portion B1 are incident upon the support portion B2, either directly without being reflected by the side surfaces of the optical elements b1 through b5, or after having been reflected by the side surfaces of the optical elements b1 through b5. The light fluxes which are incident upon the support portion B2 are refracted by the action of the Fresnel surface F. and are directed so as to illuminate the photographic subject.

And, as has been explained with reference to FIG. 7, the optical transmission element B thus can propagate the light while suitably restraining the spreading out of the light fluxes.

It should be noted that if the boundary surfaces are formed so as to have predetermined slopes so that they actually come to be not parallel to one another, then the spreading out of the light flux which is emitted from the optical transmission element B becomes greater than in the case that the boundary surfaces are formed so as to be mutually parallel. Accordingly, it is desirable to form the boundary surfaces m1 through m10 of the optical transmission element B to be as parallel to one another as possible, in order to restrain the spreading out of the light flux, as is desirable.

It is desirable to manufacture the above described optical transmission element B as a unit by injection molding using a substance such as, for example, acrylic resin. Since in this case the boundary surfaces m1 through m10 are formed with slight inclinations they are not parallel as a whole, but it is possible to form them almost parallel.

A First Variant of the Optical Transmission Element

Figure 13:
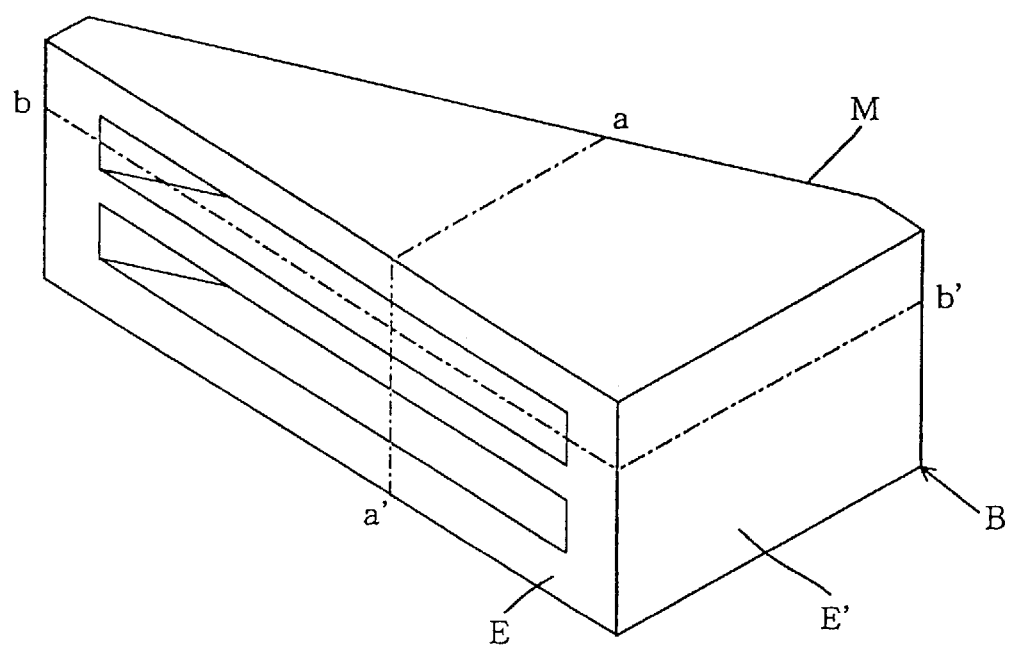
FIG. 13 is a perspective view showing in sketch form the structure of a first variant embodiment of the optical transmission element.
Figure 14:
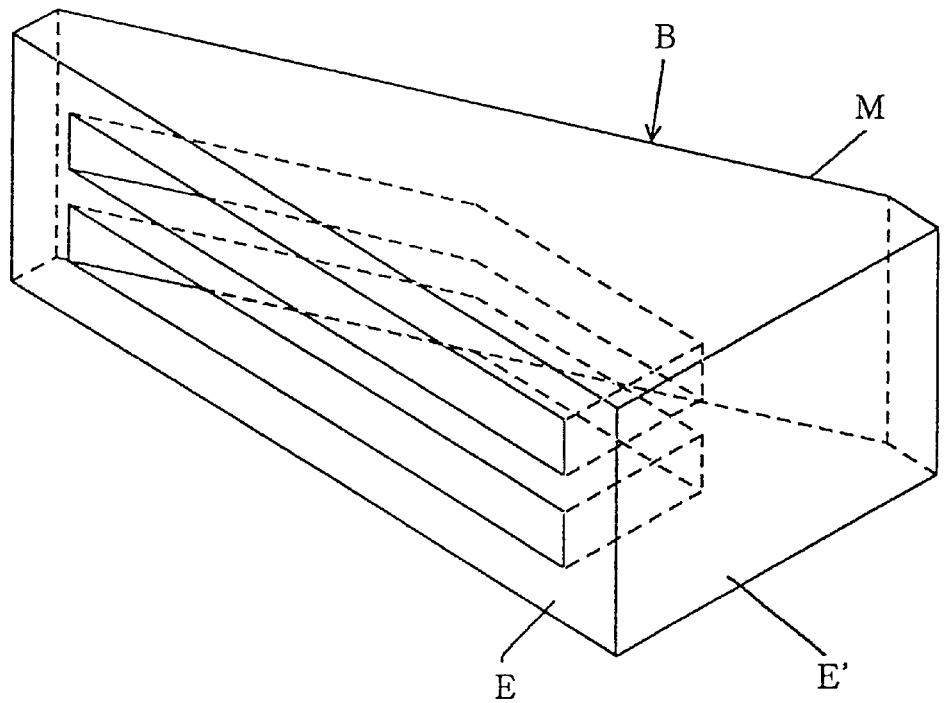
FIG. 14 is a transparent version of FIG. 13.
Figure 15:
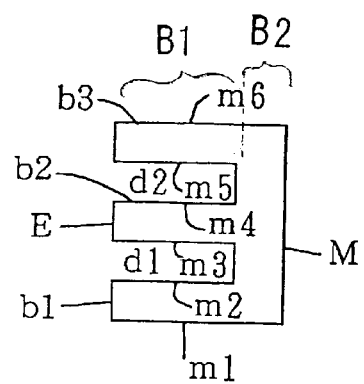
FIG. 15 is a sectional view taken on the line a–a' in FIG. 13.
Figure 16:
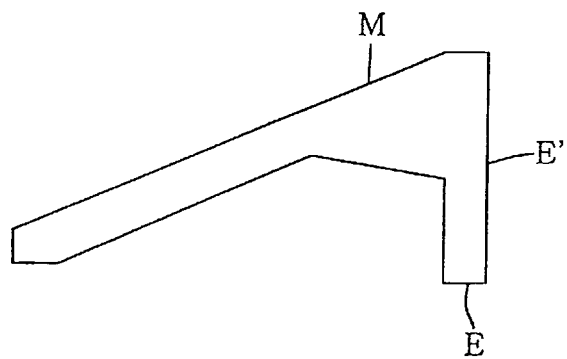
FIG. 16 is a sectional view taken on the line b–b, in FIG. 13.

FIG. 13 is a perspective view showing in sketch form the structure of a first variant embodiment of the optical transmission element. Further, FIG. 14 is a transparent version of FIG. 13. Moreover, FIG. 15 is a sectional view taken on the line a–a' in FIG. 13. And, further, FIG. 16 is a sectional view taken on the line b–b' in FIG. 13.

As shown in FIGS. 13 through 16, this first variant embodiment optical transmission element B is formed from a light transmitting portion B1 and a support portion B2. The light transmitting portion B1 is formed from three optical elements b1 through b3 which are arranged so as to be separated by two air gaps d1 and d2. Thus boundary surfaces m1 through m6 are defined between the optical elements and the air gaps. These boundary surfaces m1 through m6 are plane surfaces which are almost mutually parallel, and the light transmitting portion B1 is formed so that the gaps between two neighboring boundary surfaces are almost the same. It should be noted that an incident face E is defined on the free end surface of the optical elements b1 through b3, while a reflecting surface M and an emitting surface E' are defined on the support portion B2.

Figure 17:
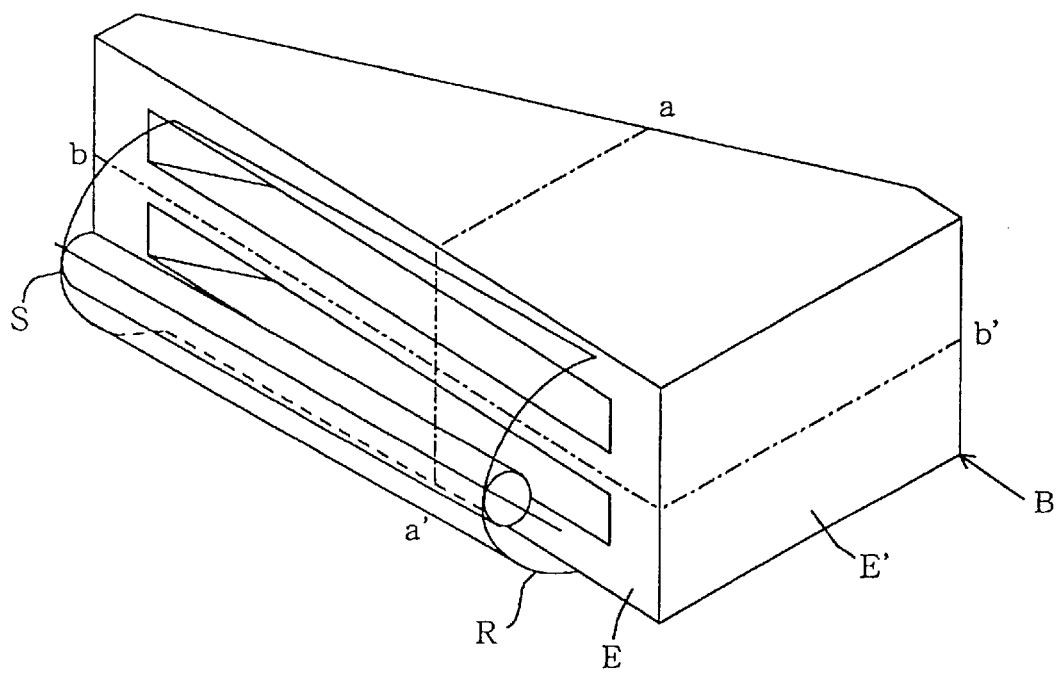
FIG. 17 is a perspective view showing the construction of an electronic flash device optical system for a lens shutter type camera which includes an optical transmission element B according to the first variant embodiment.
Figure 18:
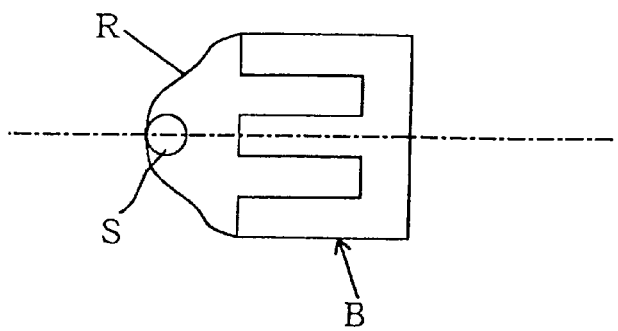
FIG. 18 is a sectional view taken on the line a–a' in FIG. 17.

FIG. 17 is a perspective view showing the construction of an electronic flash device optical system for a lens shutter type camera to which this optical transmission element B according to the first variant embodiment is fitted. Further, FIG. 18 is a sectional view taken on the line a–a' in FIG. 17. And FIG. 19 is a sectional view taken on the line b–b' in FIG. 17.

Figure 19:
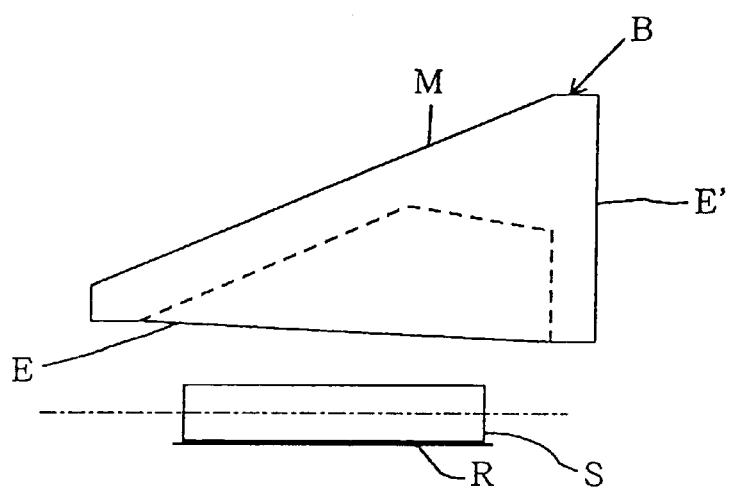
FIG. 19 is a sectional view taken on the line b–b' in FIG. 17.

Referring to FIGS. 17 through 19, the optical transmission element B is arranged on one side of the xenon flash lamp S which is the light source, while the reflector R is arranged around the other side of the xenon flash lamp S so as to enfold the xenon flash lamp S.

Accordingly, the light fluxes which are emitted by the xenon flash lamp S are incident upon the incident face E of the light transmitting portion B1 (the optical elements b1 through b3 and the air gaps d1 and d2) of the optical transmission element B either directly not via the reflector R, or after having been reflected off the reflector R. The light fluxes which are incident upon the incident face E of the light transmitting portion B1 are emitted in the direction of the photographic subject from the emitting face E' after having been reflected by the reflecting surface M.

In this manner, with this first variant embodiment of the optical transmission element B as well, it is possible to propagate the light from the light source while suitably restraining the spreading out of the light fluxes.

A Second Variant of the Optical Transmission Element

Figure 20:
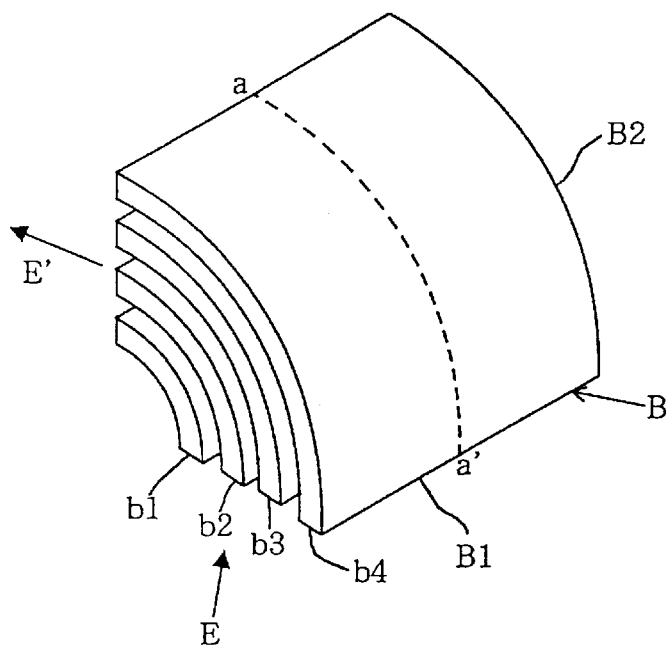
FIG. 20 is a perspective view showing in sketch form the structure of a second variant embodiment of the optical transmission element.
Figure 21:
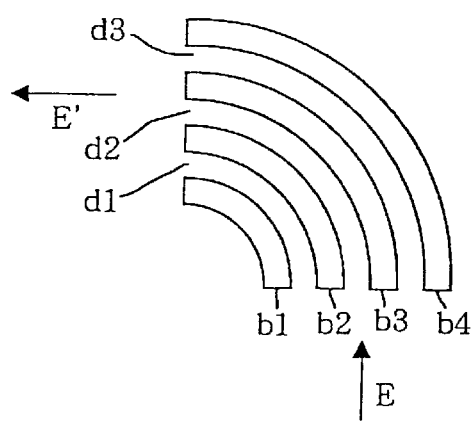
FIG. 21 is a sectional view taken on the line a–a' in FIG. 20.

FIG. 20 is a perspective view showing in sketch form the structure of a second variant embodiment of the optical transmission element of the present invention. Further, FIG. 21 is a sectional view taken on the line a–a' in FIG. 20. It should be noted that in this second variant embodiment an exemplary optical transmission element is shown which is for altering the direction of propagation of the light flux.

As shown in FIGS. 20 and 21, this second variant embodiment of the optical transmission element B is formed from a light transmitting portion B1 and a support portion B2. The light transmitting portion B1 is formed from four optical elements b1 through b4 of part circular cylindrical form which are arranged so as to be separated by three air gaps d1 through d3. And each of the optical elements b1 through b4 is supported in a cantilevered manner from the support portion B2. With this second variant embodiment, the direction of propagation of a light flux which is incident along the direction shown by the arrow E in the figure is altered by the action of the optical transmission element B, so that the light flux is emitted in the direction shown by the arrow E' in the figure.

A Third Variant of the Optical Transmission Element

Figure 22:
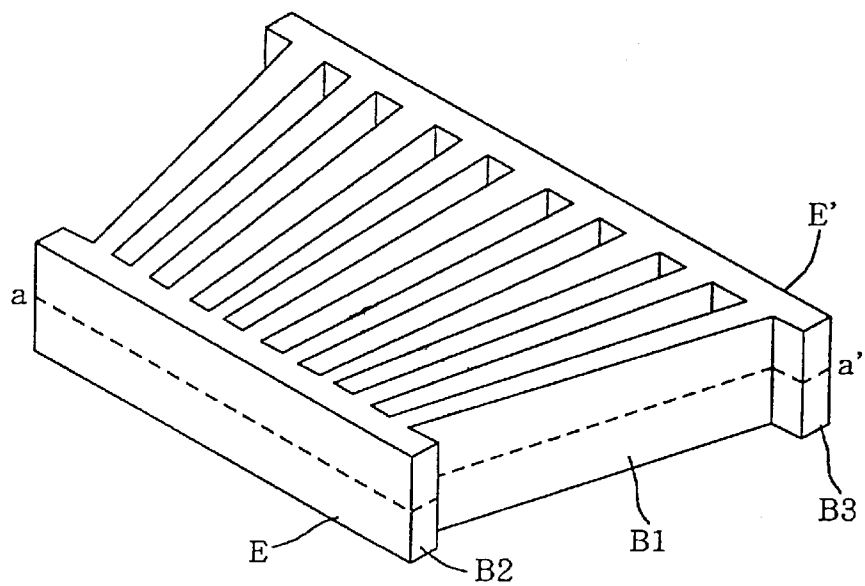
FIG. 22 is a perspective view showing in sketch form the structure of a third variant embodiment of the optical transmission element.
Figure 23:
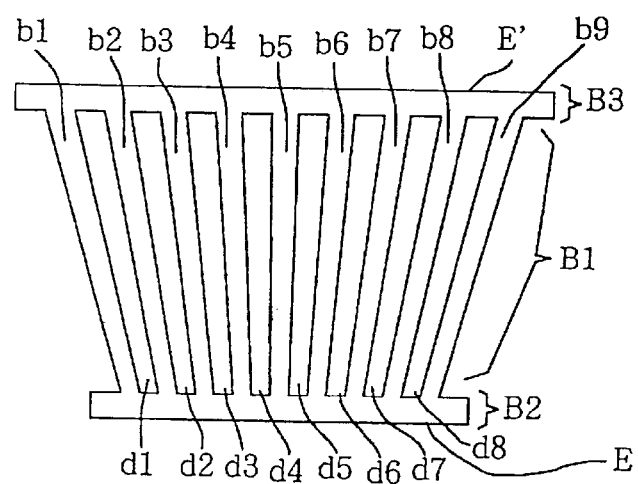
FIG. 23 is a sectional view taken on the line a–a' in FIG. 22.

FIG. 22 is a perspective view showing in sketch form the structure of a third variant embodiment of the optical transmission element. Further, FIG. 23 is a sectional view taken on the line a–a' in FIG. 22. It should be noted that this third variant embodiment is, by way of example, a beam expander.

As shown in FIGS. 22 and 23, this third variant embodiment of the optical transmission element B is formed from a light transmitting portion B1 and two support portions B2 and B3. The light transmitting portion B1 is formed from nine optical elements b1 through b9 which are arranged so as to be separated by eight air gaps d1 through d8. And each of the optical elements b1 through b9 is supported by the support portions B2 and B3. These optical elements b1 through b9 and air gaps d1 through d8 are formed so as to diverge from one another in the direction from the support element B2 towards the support element B3.

Accordingly, with this third variant embodiment, a light flux which is incident upon an incident face E which is formed upon the support portion B2 is transmitted through the light transmitting portion B1 by the action of which its light flux width is widened, and is then emitted from an emitting face E' which is formed upon the support portion B3.

It should be noted that it would be possible to narrow down the width of the light flux by reversing the direction of this optical transmission element B according to the third variant embodiment, in other words by using it with the incident face E and the emitting face E' interchanged.

A Fourth Variant of the Optical Transmission Element

Figure 24:
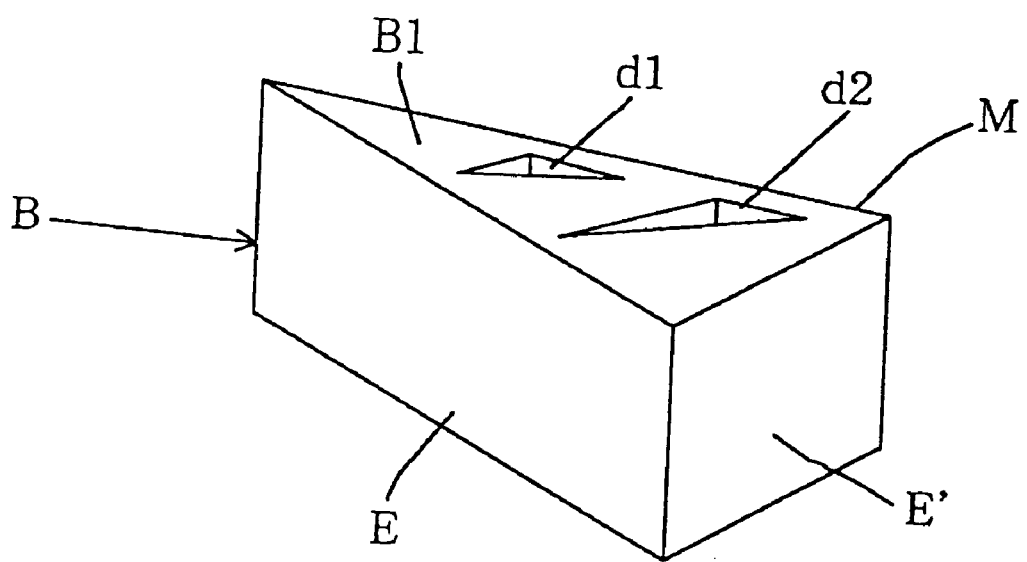
FIG. 24 is a perspective view showing in sketch form the structure of a fourth variant embodiment of the optical transmission element.

FIG. 24 is a perspective view showing in sketch form the structure of a fourth variant embodiment of the optical transmission element of the present invention.

The optical transmission element of this fourth variant embodiment is formed by varying the shape of the optical transmission element of the first variant embodiment, and fulfills a function identical to that of that optical transmission element of the first variant embodiment. Accordingly, in FIG. 24, a light flux incident upon the optical transmission element B falls upon the incident face E, and is reflected by the reflecting face M after being propagated through the light transmitting portion B1. This light flux which is reflected from the reflecting face M is emitted from the emitting face E'. The light transmitting portion B1 is made up of an optical element and air gaps d1 and d2. It should be noted that it is possible to anticipate elevation of the efficiency of illumination by inserting this optical transmission element of the fourth variant embodiment into the optical path of an electronic flash device optical system.

Preferred Embodiment 2

A second preferred embodiment of the present invention as will now be explained as applied to an externally fitted electronic flash device, with reference to FIGS. 25 through 27. The theory is the same as for the first preferred embodiment.

Figure 25:
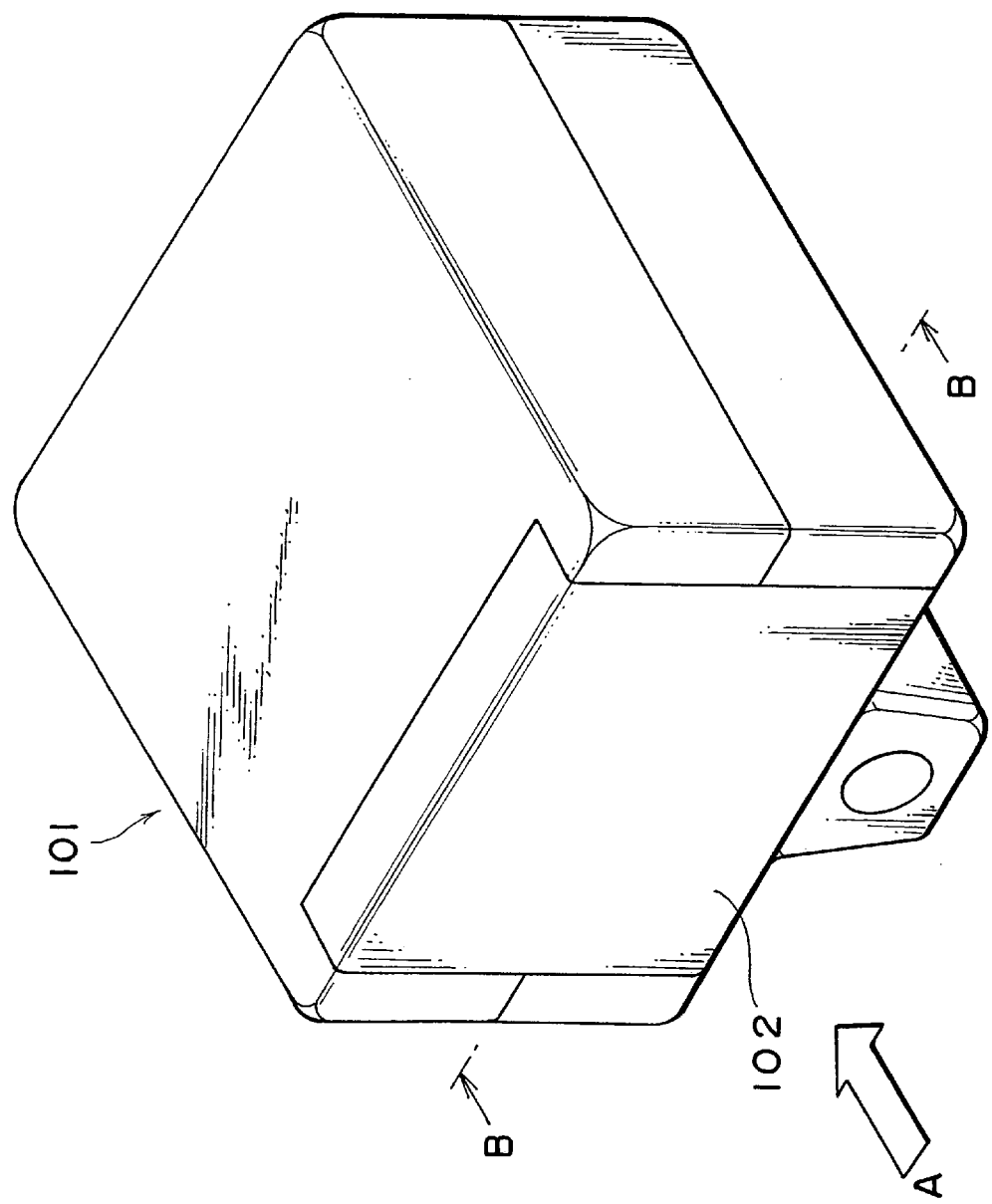
FIG. 25 is a perspective view of an externally attached electronic flash device according to a second preferred embodiment of the present invention.

FIG. 25 is a perspective view of an externally attached (or mounted) electronic flash device according to this second preferred embodiment of the present invention. FIG. 26 is an elevational view of the electronic flash device of FIG. 25 as seen in a direction shown by the arrow A in that figure, with a portion cut away. In FIG. 26, the portion D is cut away to a greater depth than is the cut away portion C. And FIG. 27 is a sectional view taken on the line B—B in FIG. 25.

Figure 26:
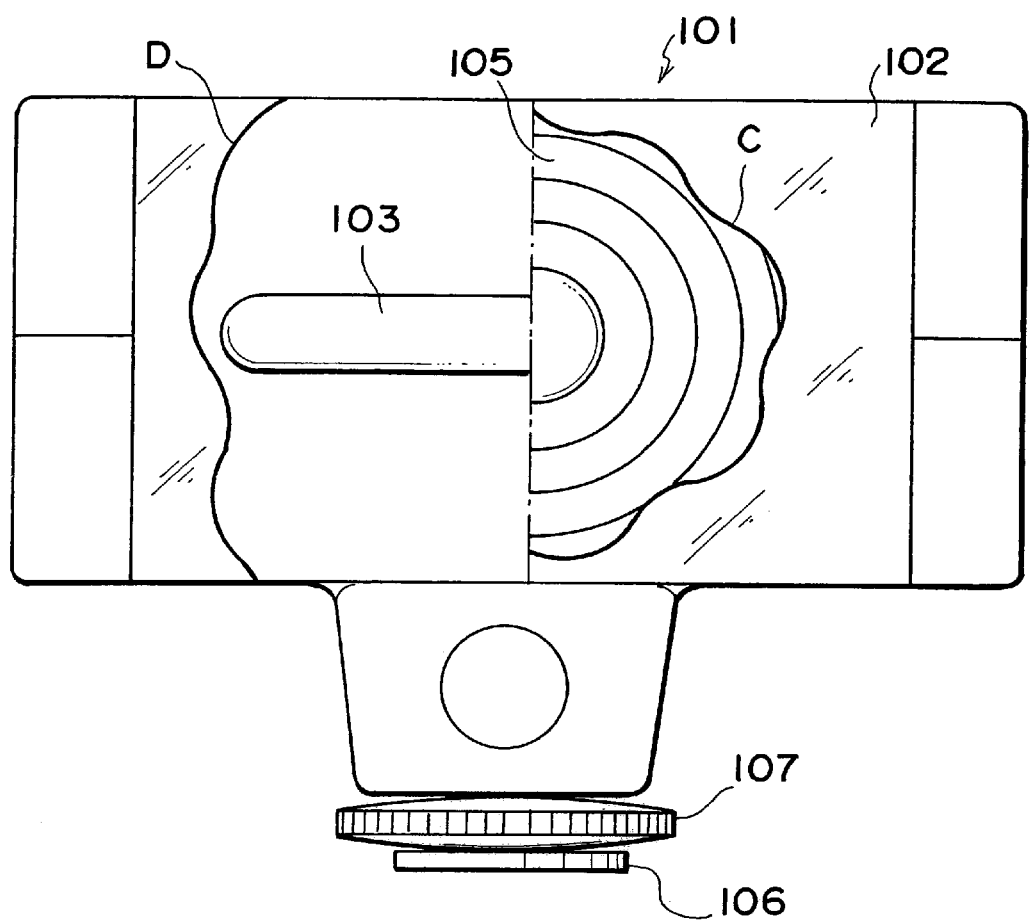
FIG. 26 is an elevational view of the electronic flash device of FIG. 25 as seen in a direction shown by the arrow A in that figure.
Figure 27:
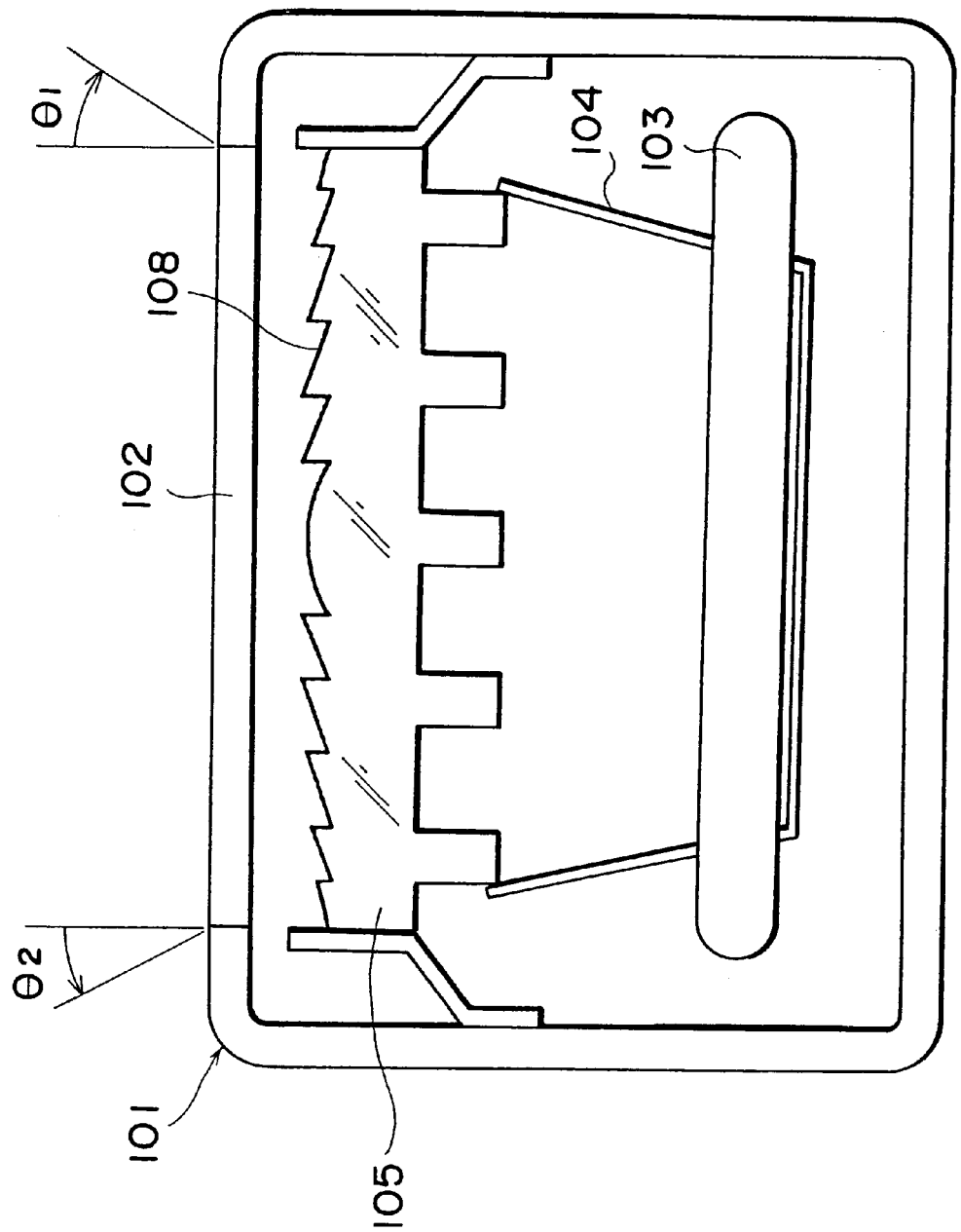
FIG. 27 is a sectional view taken on the line B—B in FIG. 25.

In FIGS. 25 through 27, the reference numeral 101 denotes the externally fitted electronic flash device overall, while 102 is a flash light window, 103 is an electric discharge tube which emits light for photography, 104 is a reflector which reflects light which is emitted from the electric discharge tube 103, and 105 is a protector made from transparent resin which diffuses the light which is emitted from the electric discharge tube 103. Further, 106 is a connecting portion, 107 is a fixing portion for fixing the electronic flash device 101 to the main body of a camera (not shown); and to the connecting portion 106 there are provided signal terminals (not shown in the figures) which can make contact with corresponding signal terminals (also not shown) which are provided in the body of the camera.

As shown in FIGS. 26 and 27, the electric discharge tube 103 is generally cylindrical in form and extends transversely across this externally fitted electronic flash device 101, and electrodes not shown in the figure are provided at both ends of this electric discharge tube 103. Gas discharge is produced between these electrodes by the application of voltage between these electrodes, and the entire body of the electric discharge tube 103 is illuminated to an almost uniform brightness. As is shown in FIG. 27, the reflector 104 is folded round from the side of the electric discharge tube 103 at the rear of the camera to positions adjoining both of the ends of the protector 105 and also is grounded, and reflects light which is emitted from the electric discharge tube 101 in the directions rearwards and sideways to the camera.

When this externally fitted or attached electronic flash device 101 is fitted to the main body of the camera it is held fixed thereto by the fixing portion 107, and the signal terminals in the connecting portion 106 make contact with the corresponding signal terminals in the main body of the camera. Signals can be transmitted to and fro between the main body of the camera and the externally fitted electronic flash device 101 when the externally fitted electronic flash device 101 is in this state of being fixed to the main body of the camera.

When voltage is applied between the electrodes of the electric discharge tube 103 in response to signals which are dispatched from the main body of the camera, the electric discharge tube 103 emits light, and a portion of the emitted light falls directly upon the protector 105, while another portion thereof is reflected off the reflector 104. When the protector 105 is thus illuminated, both directly by light which has been emitted from the electric discharge tube 103 and indirectly by light which has been reflected off the reflector 104, this illuminating light is prevented from being diffused and is directed with high efficiency to a Fresnel lens 106 which is formed upon the front surface of the protector 105. This light is diffused by the Fresnel lens 106 on the front surface of the protector 105 and is emitted through the flash light window 102 so as to illuminate the photographic subject. θ1 denotes the angle to the right over which the light is emitted, and θ2 the angle to the left. With this externally fitted electronic flash device 101 according to the second preferred embodiment of the present invention, it is possible to obtain a relatively wide angle of illumination although the light is emitted from the electronic flash device through a relatively small flash light window 102, and thus reduction in the size of the externally fitted electronic flash device is made possible.

Furthermore it also becomes possible, with this externally fitted electronic flash device 101 according to the second preferred embodiment, to increase the distance between the Fresnel lens 106 on the front surface of the protector 105 and the electric discharge tube 103. That is to say, when arranging the various elements within the externally fitted electronic flash device, there is no restriction that the Fresnel lens 106 and the electric discharge tube 103 are required to be close together. Accordingly, freedom in designing the flash device is enhanced.

Although the above described exemplary first and second preferred embodiments of the optical transmission element and the illumination device of the present invention which were described above were incorporated in camera electronic flash devices, it should be understood that the optical transmission element and the illumination device of the present invention are not necessarily limited to that context in their application. The optical transmission element of the present invention, as has been explained above, can also be employed in various sorts of illumination optical system, such as a light taking-in optical system for illuminating a visual field frame in a light taking-in type viewfinder, an illuminating optical system of an internally illuminating type viewfinder, or a backlight optical system which is used for an LCD panel or the like. Further, the illumination device of the present invention can also be employed in various types of application, such as an illumination device for a video camera or the like.

What is claimed is:

1. An optical transmission element, comprising:
   a light transmitting portion that includes a plurality of optical elements that are arranged so as to be separated by air gaps, and said air gaps, wherein:
   light that is incident upon said light transmitting portion along a predetermined direction is transmitted through said light transmitting portion while reflecting on reflecting surfaces constituted by boundary surfaces that are defined between said optical elements and said air gaps, and boundary surfaces that face each other across an air gap that are formed so that both the boundary surfaces facing each other substantially reflect the light incident upon said light transmitting portion to lead the light from one end at an incident side of said light transmitting portion to another end of said light transmitting portion.

2. An optical transmission element according to claim 1, wherein said optical element is made from a transparent material whose refractive index is greater than that of air.

3. An optical transmission element according to claim 1, further comprising:
   a support portion that connects said plurality of optical elements each other and supports said plurality of optical elements at least at one end sides thereof.

4. An optical transmission element according to claim 3, wherein said support portion has a refractive function, and light that is transmitted through said light transmitting portion is refracted by said support portion and is directed over a predetermined range.

5. An optical transmission element according to claim 3, wherein said optical elements and said support portion are formed as one unit from a transparent material whose refractive index is greater than that of air.

6. An illumination device, comprising:
   a light source; and
   a light transmitting portion that includes a plurality of optical elements that are arranged so as to be separated by air gaps, and said air gaps, wherein:
   light that is emitted from said light source is incident upon one end side of said light transmitting portion; and
   the light that is incident upon one end side of said light transmitting portion is transmitted through said light transmitting portion while reflecting on reflecting surfaces constituted by boundary surfaces that are defined between said optical elements and said air gaps, and is then emitted from another end side of said light transmitting portion, and boundary surfaces that face each other across an air gap are formed so that both the boundary surfaces facing each other substantially reflect the light incident upon said light transmitting portion to lead the light from the one end side of said light transmitting portion to the other end side of said light transmitting portion.

7. An illumination device according to claim 6, wherein said optical element is made from a transparent material whose refractive index is greater than that of air.

8. An illumination device according to claim 6, further comprising:
- a support portion that connects said plurality of optical elements each other and supports said plurality of optical elements at least at one end sides thereof, wherein
  - said support portion has a refractive function, and light that is transmitted through said light transmitting portion is refracted by said support portion and is emitted over a predetermined range.

9. An illumination device according to claim 6, wherein each length of said optical elements in a direction of light transmitting is greater than or equal to 1/5 of a locating interval of said plurality of optical elements separated by said air gaps.

10. An illumination device according to claim 8, wherein said optical elements and said support portion are formed as one unit from a transparent material whose refractive index is greater than that of air.

11. An illumination device according to claim 10, wherein said support portion has said refractive function by forming a Fresnel lens on its surface opposite to where said optical elements are connected.

12. An illumination device for a camera that emits light towards a photographic subject, comprising:
- an electric discharge tube that emits light by electric discharge;
- a light transmitting portion that leads light that has been emitted from said electric discharge tube towards a front of said illumination device;
- said light transmitting portion including a plurality of transparent members that respectively extend in a back and forth direction of the illumination device, respectively having a rectangular shape in cross section and being arranged in a lengthwise direction of said electric discharge tube, and
- said plurality of transparent members being arranged so as to be separated by air gaps, wherein:
  - light that is emitted from said electric discharge tube is incident upon one end side of said light transmitting portion; and
  - the light that is incident upon one end side of said light transmitting portion is transmitted through said light transmitting portion while reflecting on reflecting surfaces constituted by boundary surfaces that are defined between said transparent members and said air gaps, and is then emitted from another end side of said light light transmitting portion, and boundary surfaces that face each other across an air gap are formed so that both the boundary surfaces facing, each other substantially reflect the light incident upon said light transmitting portion to lead the light from the one end side of said light transmitting portion to the other end side of said light transmitting portion.

13. An illumination device according to claim 12, further comprising
- a directing portion that directs light that has been led via said light transmitting portion over a predetermined range.

14. An illumination device for a camera that emits light towards a photographic subject with predefined angles which regulate a range of emitting light out of the illumination device, comprising:
- a light source;
- a light transmitting portion that leads light that has been emitted from said light source towards a front of said illumination device; and
- a window through which said light lead by said light transmitting portion passes toward the photographic subject, wherein
  - a size of said window is defined so that at least a part of said light source is located out of a space that is surrounded by a plane of said window and planes which pass edges of said window with said predefined angles.

15. An optical transmission element, comprising:
- a light transmitting portion that includes a plurality of optical elements that are arranged so as to be separated by air gaps, and said air gaps, wherein:
  - light that is incident upon said light transmitting portion along a predetermined direction is transmitted through said light transmitting portion while reflecting on reflecting surfaces constituted by boundary surfaces that are defined between said optical elements and said air gaps, and each of said optical elements has a shape of a parallelepiped.

* * * * *